US011172114B2

(12) United States Patent
Allen et al.

(10) Patent No.: US 11,172,114 B2
(45) Date of Patent: Nov. 9, 2021

(54) SYSTEM AND METHOD FOR PHOTOGRAPHY

(71) Applicants: Michael Allen, San Luis Obispo, CA (US); Jasper Michalczik, Berlin (DE); Jeremy Fissell, San Luis Obispo, CA (US)

(72) Inventors: Michael Allen, San Luis Obispo, CA (US); Jasper Michalczik, Berlin (DE); Jeremy Fissell, San Luis Obispo, CA (US)

(*) Notice: Subject to any disclaimer, the term of this patent is extended or adjusted under 35 U.S.C. 154(b) by 0 days.

(21) Appl. No.: 17/161,611

(22) Filed: Jan. 28, 2021

(65) Prior Publication Data
US 2021/0195088 A1 Jun. 24, 2021

(51) Int. Cl.
*H04N 5/232* (2006.01)
*G03B 15/03* (2021.01)
*H04N 5/225* (2006.01)

(52) U.S. Cl.
CPC ......... *H04N 5/23203* (2013.01); *G03B 15/03* (2013.01); *H04N 5/2256* (2013.01)

(58) Field of Classification Search
CPC .... G03B 37/02; G03B 15/07; G03B 15/0431; G03B 15/03; G03B 17/38; H04N 17/002
See application file for complete search history.

(56) References Cited

U.S. PATENT DOCUMENTS

| 2003/0035061 A1* | 2/2003 | Iwaki | G06T 17/10 348/371 |
| 2005/0041096 A1* | 2/2005 | Horita | H04N 13/221 348/42 |
| 2007/0172216 A1* | 7/2007 | Lai | G03B 35/02 396/5 |

* cited by examiner

Primary Examiner — Nelson D. Hernández Hernández
(74) Attorney, Agent, or Firm — Barry Choobin; Patent 360

(57) ABSTRACT

The present invention is directed to a system for photography comprising a light sensor configured to detect a flash from a strobe light and in response produce a sensor signal; a control unit operably coupled to a camera and a photography platform, the control unit configured to send a command to the camera for triggering the camera and the strobe light, capture a time at which the command is sent, receive the sensor signal from the light sensor, the sensor signal indicative of the flashing of the light source, determine a calibration value based on the difference between the time at which the sensor signal is received by the control unit and the time at which the command is sent to the camera by the control unit, and calibrate itself based on the calibration value.

17 Claims, 3 Drawing Sheets

SYSTEM AND METHOD FOR PHOTOGRAPHY

CROSS-REFERENCE TO RELATED APPLICATIONS

This application claims priority to the U.S. provisional patent application Ser. No. 62/865,642 filed on Jun. 24, 2019, which is incorporated herein by reference in its entirety.

FIELD OF INVENTION

The present disclosure discloses a system and method for photography, and particularly, the present disclosure discloses a system and method for an automated photo shoot an object at multiple view angles.

BACKGROUND

Photography turntables are a kind of photography platforms, and specifically are a rotating platform with a bearing attached underneath to allow for a smooth 360-degree rotation. An object to be photographed can be put on the platform, and the platform can be rotated clockwise or counterclockwise with incremental pauses to allow for a stationary camera to photoshoot the object at a variety of evenly spaced angles. The platform can be rotated manually or can also be motorized. An electric motor can be incorporated for rotating the platform. Such turntables with electric motors are often referred to as continuous motorized photography turntables. The continuous motorized photography turntables rotate at a slow speed but continuous without stopping. These types of turntables are economical than turntables having step motors provided with incremental turns.

The continuous motorized photography turntables are economical and quick, but capturing still photographs can be difficult, if not impossible. It is difficult to accurately time the capture of each angle consistently by eye, while the turntable is continuously rotating. A known solution is to capture a video instead with a digital video camera, commonly known as continuous Video Capture. However, continuous video capture has its disadvantages which include, but are not limited to, producing 360-degree imagery with a significantly reduced resolution, sharpness, and overall visual quality.

Automation of the continuous motorized photography turntable is a possible solution to overcome the men's capability to capture accurate photographs of an object placed on the continuous motorized photography turntable. This type of system requires a photography turntable which is both motorized and computer controlled. The computer can control both the turntable and the camera. The computer tells the turntable when to rotate and speed of the rotation, and it also sends a command to the camera to shoot when the object is at the desired view angle. Despite the automation of both the turntable and the camera, the captured images suffer from motion blur because the turntable platform rotates at a continuous speed, without pausing, while the camera captures each photo. Turning the platform at a slow speed can be a possible solution, but it makes the process slow and impractical. Another approach is to adjust the camera's shutter speed to an extremely fast setting, for example, one thousand of a second. However, with such a fast shutter speed, the captured photography are critically underexposed without the use of impractically expensive "continuous lights" used for professional movie sets; and second, the camera's other settings will also need to be adjusted to compensate for the fast shutter speed, resulting in an image with less overall end-to-end object sharpness and more digitally introduced noise/grain.

Thus, a need is appreciated for a system that can use the economical and quick continuous motorized photography turntable while capturing high quality and accurate photographs.

SUMMARY OF THE INVENTION

The principal object of the present invention is therefore directed to a system and method for photoshoot an object placed on a continuous motorized photography turntable.

It is a further object of the present invention that the system can self-calibrate itself for capturing accurate view angles.

In one aspect, a system is disclosed herein for photography which includes a light sensor configured to detect a flash from a light source and in response produce a sensor signal; a control unit operably coupled to a camera and a photography platform, the camera couple to the light source; the control unit can be configured to send a command to the camera for triggering the camera and the light source; capture a time at which the command is sent; receive the sensor signal from the light sensor, the sensor signal indicative of the flashing of the light source; determine a calibration value based on the difference between the time at which the sensor signal is received by the control unit and the time at which the command is sent to the camera by the control unit, and calibrate itself based on the control value.

In one aspect, the light source is a strobe light and the photography platform can be a continuous motorized photography turntable.

In one aspect, the control unit can be further configured to set the speed of the continuous motorized photography turntable. Moreover, the control unit can be further configured to receive desired view angles of an object to be photoshoot; and determine timings for triggering the camera based on the desired view angles, speed of the turntable, and the calibration value. Furthermore, the control unit is further configured to receive a modification of the calibration value; and recalibrating itself based on the modified calibration value.

In one aspect, a method is disclosed herein for calibrating a system for photography, the system comprising a photography platform, a camera, a light source, a light sensor, and a control unit, the control unit operably coupled to the photography platform, the light sensor, and the camera, the method comprising sending, by the control unit, a command to the camera for triggering the camera and the light source; capturing, by the control unit, a time at which the command was sent; receiving, by the control unit, a sensor signal from the light sensor, the sensor signal result from flashing of the light source; determining, by the control unit, a calibration value based on the difference between a time at which the sensor signal is received and the time at which the command is sent; and calibrating itself based on the calibration value.

In one aspect, a system is disclosed herein for photography comprising a continuous motorized photography turntable; a camera positioned to capture a photograph of an object placed on the continuous motorized photography turntable; a strobe light operably coupled to the camera; a control unit operably coupled to the continuous motorized photography turntable and the camera, the control unit configured to control the rotation of the continuous motorized photography turntable; send a command to the camera for triggering the camera and the strobe light; receive a calibration value, wherein the calibration value is based on an interval between a time at which the command is sent to the camera and a time at which the strobe light flashes; and calibrating itself based on the calibration value.

In one aspect, the control unit disclosed herein can further determine timings for triggering the camera to photoshoot the object at distinct view angles based on the rotation speed of the continuous motorized photography turntable and the calibration value.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
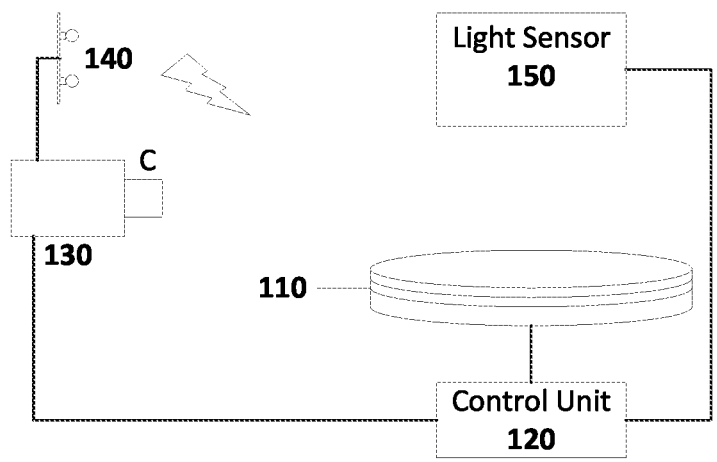
FIG. 1 is a block diagram of the system.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

The present disclosure provides a system and method that uses a continuous motorized photography turntable as a platform for photography and captures high-quality photographs without motion blur and having accurate view angles. The system can use strobe lights which emits a very bright flash and that is extremely fast. Strobe lights are also relatively less expensive to acquire, operate, maintain, and store when compared to extremely bright continuous lights. The use of strobe lights is an inexpensive method for reducing motion blur, however, angle accuracy of each image capture is significantly compromised with strobe lights. The faster the turntable rotates, the more inconsistent and inaccurate each capture angle becomes. The system according to the present invention allows for compensating the delay in the camera's exposure to overcome the problem of compromised view angles in captured photographs. The delay in the camera's exposure is related to the time between sending a command to the camera to fire, and the actual firing of the camera. When using strobe lights, the exposure delay is the time between sending the command to the camera to fire, and the strobe light firing. While an object is continuously rotating on a computer-controlled turntable, the system can send a command to the camera to fire at the precise moment the turntable platform rotates through the target capture angle. However, there is a slight delay, as the camera receives the command, open its shutter, and send a command to the strobe light to flash. Next, the strobe light itself receives a command from the camera and then begin to flash on. In one case, this exposure delay can be so long to offset the angle of the capture by as much as 2 degrees. This is because the entire image exposure event occurs only when the strobe light momentarily flashes on for a fraction of a second.

The system disclosed herein can be calibrated to overcome the above-explained exposure delay. The exposure delay can include the camera's exposure delay or the strobe light's exposure delay or both. Now referring to FIG. 1, the system disclosed herein can include a control unit 120 in electrical communication with a photography platform 110, a camera 130, a strobe light 140. The system further comprises a light sensor 150 in electrical communication with the control unit 120. The control unit 120 can include software for image capture and allowing a user to interact with the system. The control unit 120 can further include a calibration module. The control unit 120 can be configured to control the rotation of the photography platform 110 and send a command to the camera 130 to shoot. The camera 130 and in turn can command the strobe light 140 to flash. In one case, the photography platform 110 is a continuous motorized photography turntable.

As shown in FIG. 1, the light sensor 150 can be positioned near the strobe light 140, such as the light sensor can receive a portion of the flash from the strobe light 140. The control unit 120 can receive a sensor signal from the light sensor 150, wherein the sensor signal is generated in response to the flash from the strobe light 140 falling on the light sensor 150. In brief, the sensor signal indicates the time of the flashing of the strobe light 140. The light sensor 150 can be configured to detect the strobe light 140. The light sensor 150 can be a photosensor known in the art for detecting an intensity of the light.

Figure 2:
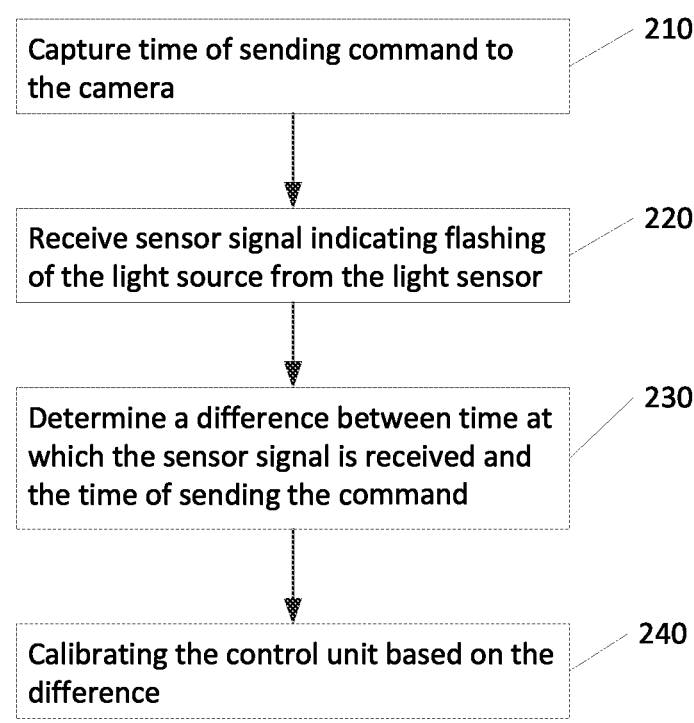
FIG. 2 is a flow diagram showing one implementation of a method.

FIG. 2 shows one implementation of the method wherein the control unit 120 sends commands to the camera 130 to shoot. The timings of these commands can be preconfigured. For example, a user can select the desired view angles of the object to be photographed, and the control unit 120 can then determine the timings of commands to be sent to the camera based on the speed of the photography platform 110. At step 210, the control unit can capture the time at which a command is sent to the camera 130. In response to the command, the camera can in turn trigger the strobe light 140 to flash. The light sensor 150 captures the flash from the strobe light 140. At step 220, the control unit 120 can receive a sensor signal from the light sensor 150, wherein the sensor signal indicates the precise time at which the strobe light 140 flashed. At step 230, the control unit 120, can then determine a difference between the time at which the sensor signal was received from the light sensor 150 and the time at which the command was sent to the camera 130, wherein the strobe light 140 flashed in response to the command. At step 240, the control unit 120 can calibrate itself based on the difference determined at step 230. The calibration can modify the timings for sending the command to the camera 130. In one case, the timings of triggering the camera as determined by the rotation speed of the photography platform 110 can be adjusted based on the calibration value, wherein the calibration value is based the difference determined at step 240.

Figure 3:
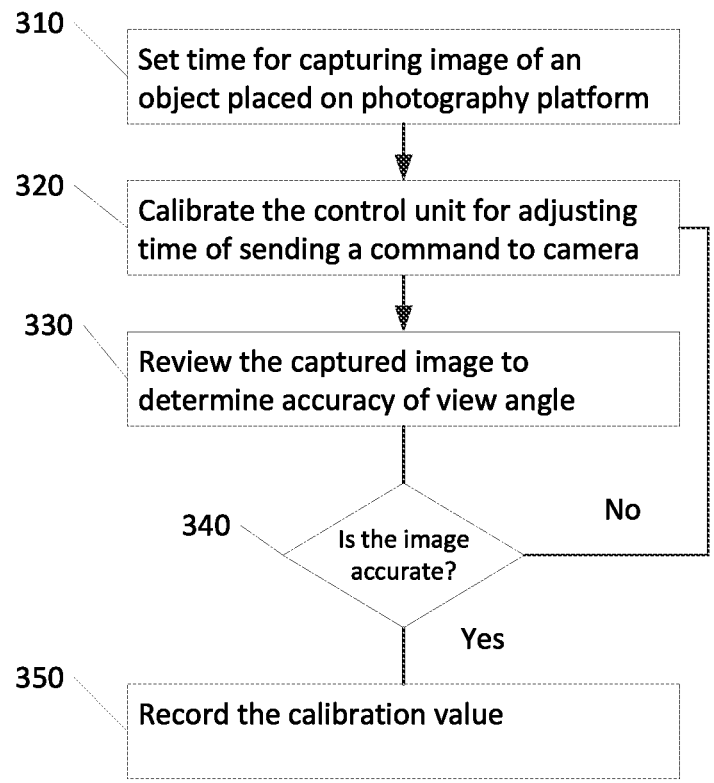
FIG. 3 is a flow diagram showing second implementation of the method.

In one implementation, the system can further allow manual calibration or further adjusting the calibration value obtained by the method illustrated in FIG. 2. Referring to FIG. 3, a time to send a command to the camera 130 can be set at step 310. This time can be manually set by the user or determined by the control unit 120. Therefore, at step 320, the control unit 120 can be calibrated based on a predetermined calibrating value or the calibration value obtained at step 240 in FIG. 2. In response to the command, the camera 130 and the strobe light 140 fires to capture the image of the object. The captured image can be reviewed by the user for any inaccuracies in view angles of the object, at step 330. A decision whether the captured view angle of the object is accurate or not can be made at step 340. In case, the captured view angles by the camera based on the calibration value set at step 320 are accurate, then the calibration value can be recorded, at step 350. In case, any inaccuracy can be spotted in the captured images, the calibration value can be modified at step 320 and the steps 330 and 340 can be repeated until the accurate images are obtained. The final calibration value can be recorded in the system resulting in the calibrated system.

In one implementation, since the exposure delay is based on the camera, photography turntable, and the strobe lights, the system can be recalibrated in case any of the above is changed. For example, the camera, turntable, and strobe lights from different manufacturers can significantly differ in terms of the exposure delay. The response time for releasing the shutter can vary between cameras of different manufacturers and different models from the same manufacturer. Additionally, each strobe light manufacturer has a different response time for firing the strobe light. The system can be recalibrated in case a different camera or a strobe light is used.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A system for photography comprising:
a light sensor configured to detect a flash from a light source and in response produce a sensor signal
a control unit operably coupled to a camera and a photography platform, the control unit configured to:
send a command to the camera for triggering the camera and the light source;
capture a time at which the command is sent;
receive the sensor signal from the light sensor, the sensor signal indicative of the flashing of the light source;
determine a calibration value based on the difference between the time at which the sensor signal is received by the control unit and the time at which the command is sent to the camera by the control unit; and
calibrate itself based on the calibration value.

2. The system of claim 1, wherein the light source is a strobe light.

3. The system of claim 1, wherein the photography platform is a continuous motorized photography turntable.

4. The system of claim 3, wherein the control unit is further configured to set the speed of the continuous motorized photography turntable.

5. The system of claim 3, wherein the control unit is further configured to:
receive a set of predetermined view angles of an object to be captured by the camera; and
determine timings for triggering the camera based on the set of predetermined view angles, speed of the turntable, and the calibration value.

6. The system of claim 1, wherein the control unit is further configured to:
receive a modification of the calibration value; and
recalibrating itself based on the modified calibration value.

7. The system of claim 1, wherein the camera is operably coupled to the light source.

8. A method of calibrating a system for photography, the system comprising a photography platform, a camera, a light source, a light sensor, and a control unit, the control unit operably coupled to the photography platform, the light sensor, and the camera, the method comprising:
sending, by the control unit, a command to the camera for triggering the camera and the light source;
capturing, by the control unit, a time at which the command is sent;
receiving, by the control unit, a sensor signal from the light sensor, the sensor signal result from flashing of the light source;
determining, by the control unit, a calibration value based on a difference between a time at which the sensor signal is received and the time at which the command is sent; and
calibrating itself based on the calibration value.

9. The method of claim 8, wherein the light source is a strobe light and the camera is a still camera.

10. The method of claim 9, wherein the camera is operably coupled to the strobe light.

11. The method of claim 8, wherein the photography platform is a continuous motorized photography turntable.

12. The method of claim 11, wherein the method further comprises a step of:
setting, by the control unit, a speed of the continuous motorized photography turntable.

13. The method of claim 12, wherein the method further comprises the steps of:
receiving, by the control unit, a set of predetermined view angles of an object to be captured by the camera, the object placed on the continuous motorized photography turntable; and
determining, by the control unit, timings for triggering the camera based on the set of predetermined view angles, speed of the continuous motorized photography turntable, and the calibration value.

14. The method of claim 8, wherein the method further comprises:
receiving, by the control unit, a modification of the calibration value; and
recalibrating the control unit based on the modified calibration value.

15. A system for photography comprising:
a continuous motorized photography turntable;
a camera positioned to capture a photograph of an object placed on the continuous motorized photography turntable;
a strobe light operably coupled to the camera and positioned to illuminate the object;
a control unit operably coupled to the continuous motorized photography turntable and the camera, the control unit configured to:
control the rotation of the continuous motorized photography turntable;
send a command to the camera for triggering the camera and the strobe light;
receive a calibration value, wherein the calibration value is based on an interval between a time at which the command is sent to the camera and a time at which the strobe light flashes; and
calibrating itself based on the calibration value.

16. The system of claim 15, wherein the system further comprises a light sensor operably coupled to the control unit, the light sensor configured to detect flashing of the strobe light and in response send a sensor signal to the control unit.

17. The system of claim 15, wherein the control unit is further configured to:
determine timings of triggering the camera for capturing photographs of the object at distinct view angles based on the rotation speed of the continuous motorized photography turntable and the calibration value.

* * * * *